(12) United States Patent
Bouts et al.

(10) Patent No.: US 6,473,697 B2
(45) Date of Patent: Oct. 29, 2002

(54) PROCESSING SEISMIC DATA

(75) Inventors: Eric Bouts, GD Rijswijk (NL); Richard Mapes Dalley, Dunkeld (GB); Gijsbert Christiaan Fehmers, GD Rijswijk (NL); Christian Friedrich Wilhelm Hocker, GD Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/791,443

(22) Filed: Feb. 23, 2001

(65) Prior Publication Data

US 2002/0022930 A1 Feb. 21, 2002

(30) Foreign Application Priority Data

Feb. 25, 2000 (EP) ............................................. 00301504

(51) Int. Cl.[7] ............................................. G01V 1/128
(52) U.S. Cl. .......................................... 702/17; 702/16
(58) Field of Search ..................................... 702/17, 16

(56) References Cited

U.S. PATENT DOCUMENTS

| 5,930,730 A | 7/1999 | Marfurt et al. |
| 5,987,388 A | 11/1999 | Crawford et al. |

FOREIGN PATENT DOCUMENTS

| WO | 99/64896 | 12/1999 |

OTHER PUBLICATIONS

International Search Report dated Jul. 31, 2001.

Primary Examiner—Edward Lefkowitz
Assistant Examiner—Anthony Gutierrez

(57) ABSTRACT

A method of processing seismic data comprising obtaining a seismic data volume covering a predetermined volume of earth; determining for each voxel in the seismic data volume the local orientation of the seismic data; determining for each voxel whether there is an edge in its neighborhood; and carrying out a smoothing operation on each voxel in the seismic data volume, wherein the direction of the smoothing operation is the local orientation of the data and wherein the smoothing operation does not go over the edge, to obtain a processed seismic data volume in which the quantity assigned to each voxel in the processed data volume is the result obtained by carrying out the smoothing operation in that voxel in the seismic data volume.

7 Claims, 3 Drawing Sheets

PROCESSING SEISMIC DATA

FIELD OF THE INVENTION

The present invention relates to a method of processing seismic data to obtain a processed seismic data volume. The seismic data is a quantity, for example the magnitude of the seismic amplitude, assigned to voxels in a seismic data volume that represents a pre-determined volume of earth. A voxel is a small volume element—the three-dimensional equivalent of a pixel. The seismic data is assigned to the center of the voxel.

BACKGROUND OF THE INVENTION

Seismic images play an important role in the study of underground formations, and in particular in the study of underground formations that contain hydrocarbons. In particular in the latter field it is of great importance to be able to identify structural and stratigraphic features in order to detect faults, which are discontinuities in the reflectors.

Therefore there is a great interest in techniques that allow noise reduction and preservation of faults, in particular there is great interest in a technique that takes into account the characteristics of the underground reflectors.

SUMMARY OF THE INVENTION

It is an object of the present invention to suppress (incoherent) noise in the seismic image without affecting the structural information in the image. The structural information is contained in the reflectors and in the faults.

To this end the method of processing seismic data to obtain a processed seismic data volume according to the present invention comprises the steps of:

a) obtaining seismic data covering a pre-determined volume of earth, which seismic data comprises a quantity assigned to a voxel in a seismic data volume that represents the pre-determined volume of earth;

b) determining for each voxel in the seismic data volume a local orientation of the seismic data, which local orientation is the orientation of a plane tangent to the seismic data in that voxel;

c) determining for each voxel whether there is an edge in its neighborhood; and d) carrying out a smoothing operation on each voxel in the seismic data volume, in a direction such that the direction of the smoothing operation is the local orientation of the data and wherein the smoothing operation does not go over the edge, to obtain a processed seismic data volume in which the quantity assigned to each voxel in the processed data volume is a result obtained by carrying out the smoothing operation in that voxel in the seismic data volume.

DETAILED DESCRIPTION OF THE DRAWINGS

The volume of the earth is a block having co-ordinate axes x, y and z, wherein x and y are the co-ordinate axes in a horizontal plane and z is the co-ordinate axis in the vertical direction, z being positive with increasing depth. The seismic data volume is a block with the same co-ordinate axes x and y in a horizontal plane as the volume of earth. However, since seismic amplitude is recorded as a function of time, which can be related to depth when the seismic velocities of the layers through which the seismic energy travels are known, the vertical co-ordinate axis is either time t or depth z. In the specification and the claims we will refer to z only, unless otherwise specified.

For the purpose of the present invention it is not relevant whether the seismic energy is generated in the underground by means of seismic activity, or whether the seismic energy is man-made and reflected by an underground reflector, which is an interface between two underground layers. However, in the specification we will refer to man-made seismic energy.

The method of the present invention applies to any seismic data two-dimensional section or three- or four-dimensional volume, in which seismic reflections of interest appear as piecewise spatially-coherent or continuous waveforms. The method of the present invention applies to both pre-stack and post-stack seismic data, such as shot gathers, receiver gathers, etcetera, and to seismic images of any of the gathers expressed both in time or in depth.

The seismic data in the volume can be presented as a seismic image in many ways. For example it can be presented in a vertical slice, wherein the t-axis (or the z-axis) lies in the plane of drawing, or in a horizontal slice, wherein the plane of drawing is parallel to the x–y plane. The horizontal slice can be a time slice or a depth slice, when the times have been converted to depths. Alternatively the seismic data volume can be displayed on a monitor, and computer programs are available to allow the user to study details of the seismic data volume.

In the method according to the present invention, the reflectors are preserved by using a filter that is oriented along the reflectors, and the faults are preserved by edge preservation.

In the specification and in the claims the expression 'relevant event' will be used to refer to a seismic event, such as a reflector, which is a seismic reflection of interest. The word 'edge' is used to refer to a discontinuity in a seismic reflection.

The first step of the method of the present invention is obtaining the seismic data covering a pre-determined volume of earth, which seismic data consists of a quantity, for example the magnitude of the seismic amplitude, assigned to the centers of voxels in a seismic data volume that represents the pre-determined volume of earth.

Figure 1:
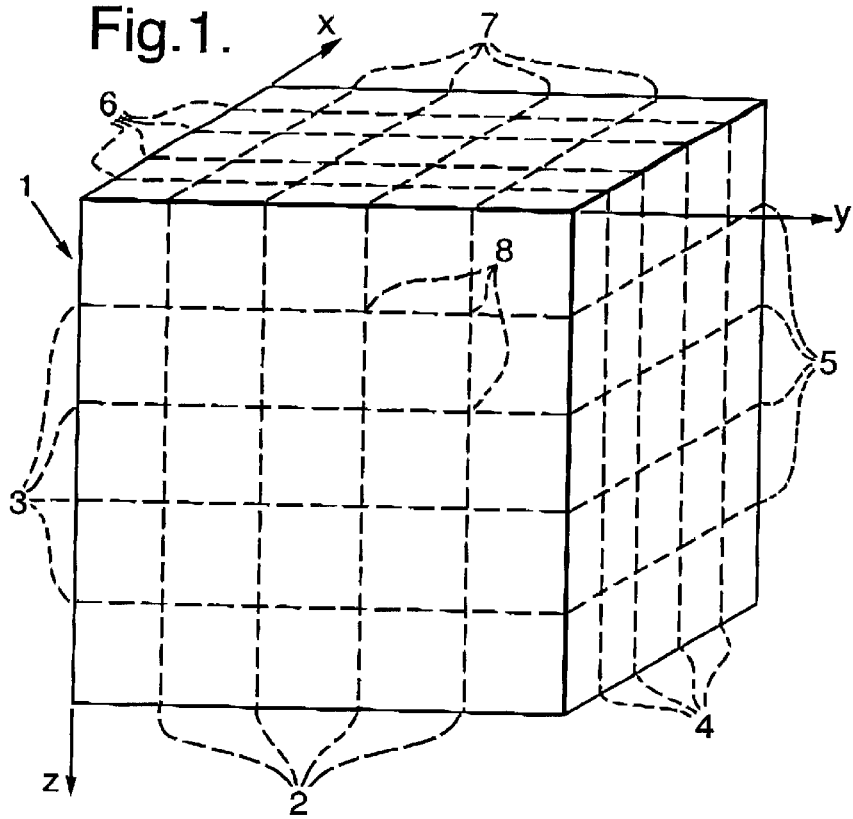
FIG. 1 shows schematically a three-dimensional seismic data volume.

Reference is made to FIG. 1 showing schematically a three-dimensional seismic data volume 1, wherein the dashed lines 2, 3, 4, 5, 6 and 7 represent the faces of the voxels 8 in the seismic data volume 1. For the sake of clarity only one voxel 8 has been schematically shown. The seismic amplitude can be thought of a quantity assigned to each of the centers of each of the voxels 8.

The next three steps of the method according to the present invention will be discussed with reference to FIG. 2.

Figure 2:
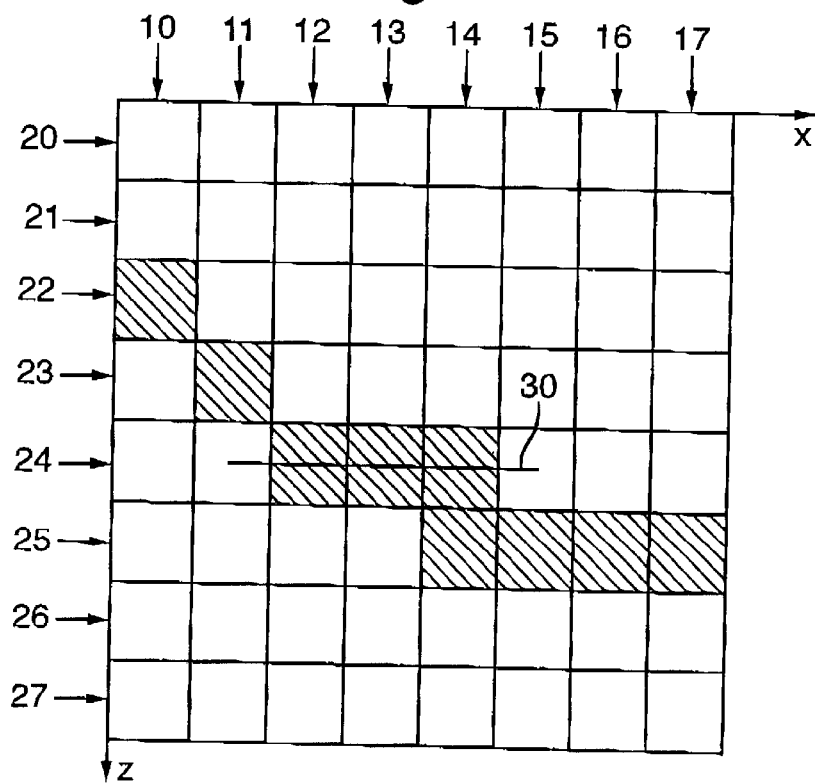
FIG. 2 shows schematically a vertical slice of part of a three-dimensional seismic data volume.

FIG. 2 shows a vertical slice of a seismic data volume like the one shown in FIG. 1. The voxels are arranged in columns 10, 11, 12, 13, 14, 15, 16 and 17, and the rows are referred to with reference indicator 20, 21, 22, 23, 24, 25, 26 and 26, such that each voxel can be referred to by means of two numbers (i,j). The voxels (10,22), (11,23), (12,24), (13,24), (14,24), (14,25), (15,25), (16,25) and (17,25) have been shaded to indicate that a larger amplitude is assigned to these voxels than to the other voxels in FIG. 2. The shaded voxels represent a relevant event.

At first, the local orientation of the seismic data is determined for each voxel in the seismic data volume, wherein which local orientation is the orientation of a plane tangent to the seismic data in that voxel. The local orientation of the seismic data is the orientation tangent to the plane with minimal amplitude variations.

The local orientation of the seismic data in a voxel is for example determined in the following way. The first step comprises taking two mutually perpendicular vertical planes (x–z and y–z) passing through the voxel. The second step comprises determining in the two mutually perpendicular vertical planes the shifts $a_{xz}$ (in the x–z plane) and $a_{yz}$ (in the y–z plane) for which the similarity of the data in a skewing semblance window around the voxel having length N and a width M is maximized, wherein the pair of shifts $(a_{xz}, a_{yz})$ defines the local orientation of the data in that voxel.

The similarity of the seismic data can be determined by determining the cross-correlation or the semblance. The semblance in the x–z plane is calculated by means of the following equation:

$$S_{xz}(x, y, z; a) = \frac{\sum_{j=-n}^{+n}\left\{\sum_{i=-m}^{+m} f[x+i, y, z+j+ai/m]\right\}^2}{M \sum_{i=-n}^{+n}\sum_{j=-m}^{+m} f[x+i, y, z+j+ai/m]^2},$$

and the semblance in the y–z plane is calculated by means of the following equation:

$$S_{yz}(x, y, z; a) = \frac{\sum_{j=-n}^{+n}\left\{\sum_{i=-m}^{+m} f[x, y+i, z+j+ai/m]\right\}^2}{M \sum_{i=-n}^{+n}\sum_{j=-m}^{+m} (f[x, y+i, z+j+ai/m])^2}.$$

In the above equations, S(x,y,z:a) is the semblance coefficient at a voxel having coordinates (x,y,z); $n=(N-1)/2$, N (an odd integer) being the length of the semblance window; $m=(M-1)/2$, M (an odd integer) being the width of the semblance window, which equals the number of traces or channels, M is also called the length of the semblance probe; a is the shift, in the open interval (–A,A); and f[x,y,z] is the quantity assigned to the voxel of which the center has the co-ordinates (x,y,z).

By way of example, the equation for $S_{xz}(x,z;a)$ will be written out for voxel (13,24) of FIG. 2 (the variable y has been omitted because it is an example in which y is constant). Furthermore we assume that M and N are equal to 3. Then $$S_{xz}(13, 24; a) = \frac{\sum_{j=-1}^{1}\left\{\sum_{i=-1}^{1} f[13+i, 24+j+ai/1]\right\}^2}{3\sum_{i=-1}^{1}\sum_{j=-1}^{1}(f[13+i, 24+j+ai/1])^2}$$

For the values of the shift a=–1, 0 and +1 this gives:

$$S_{xz}(13, 24; -1) = \frac{\sum_{j=-1}^{1}\left\{\sum_{i=-1}^{1} f[13+i, 24+j-i]\right\}^2}{3\sum_{i=-1}^{1}\sum_{j=-1}^{1}(f[13+i, 24+j-i])^2}, \text{ which is}$$

$$\frac{\{f_{12,24}+f_{13,23}+f_{14,22}\}^2 +}{3\{f_{12,24}^2+f_{13,23}^2+f_{14,22}^2+} \\ \frac{\{f_{12,25}+f_{13,24}+f_{14,23}\}^2+\{f_{12,26}+f_{13,25}+f_{14,24}\}^2}{f_{12,25}^2+f_{13,24}^2+f_{14,23}^2+f_{12,26}^2+f_{13,25}^2+f_{14,24}^2\}}$$

$$S_{xz}(13, 24; 0) = \frac{\sum_{j=-1}^{1}\left\{\sum_{i=-1}^{1} f[13+i, 24+j]\right\}^2}{3\sum_{i=-1}^{1}\sum_{j=-1}^{1}(f[13+i, 24+j])^2}, \text{ which is}$$

$$\frac{\{f_{12,23}+f_{13,23}+f_{14,23}\}^2 +}{3\{f_{12,23}^2+f_{13,23}^2+f_{14,23}^2+} \\ \frac{\{f_{12,24}+f_{13,24}+f_{14,24}\}^2+\{f_{12,25}+f_{13,25}+f_{14,25}\}^2}{f_{12,24}^2+f_{13,24}^2+f_{14,24}^2+f_{12,25}^2+f_{13,25}^2+f_{14,25}^2\}}$$

$$S_{xz}(13, 24; +1) = \frac{\sum_{j=-1}^{1}\left\{\sum_{i=-1}^{1} f[13+i, 24+j+i]\right\}^2}{3\sum_{i=-1}^{1}\sum_{j=-1}^{1}(f[13+i, 24+j+i])^2}, \text{ which is}$$

$$\frac{\{f_{12,22}+f_{13,23}+f_{14,24}\}^2 +}{3\{f_{12,22}^2+f_{13,23}^2+f_{14,24}^2+} \\ \frac{\{f_{12,23}+f_{13,24}+f_{14,25}\}^2+\{f_{12,24}+f_{13,25}+f_{14,26}\}^2}{f_{12,23}^2+f_{13,24}^2+f_{14,25}^2+f_{12,24}^2+f_{13,25}^2+f_{14,26}^2\}}$$

In the equations f[i,j] is replaced by $f_{i,j}$ to shorten the length of the written out equations.

The value $a_{xz}$ is then the value of the shift a pertaining to $\max\{S_{xz}(13, 24;-1), S_{xz}(13, 24;0), S_{xz}(13,24;+1)\}$. From written out equations, it can be seen that the semblance window is skewing with different values of the shift a.

This procedure is then repeated for each voxel, to obtain for each voxel the pair of shifts $(a_{xz}, a_{yz})$ for which the similarities are maximized. The pair of shifts $(a_{xz}, a_{yz})$ determines the local orientation of the seismic data. The local orientation of the seismic data is in general parallel to the orientation of a relevant event. In the two-dimensional representation the orientation consists of the dip, however, in three dimensions the orientation further includes the azimuth. The dip and the azimuth can be obtained from the pair of shifts $(a_{xz}, a_{yz})$ for which the similarities are maximized.

The next two steps of the method according to the present invention comprise determining for each voxel whether there is an edge in its neighborhood; and carrying out a smoothing operation on each voxel in the seismic data volume, wherein the direction of the smoothing operation is the local orientation of the data and wherein the smoothing operation does not go over the edge, to obtain a processed seismic data volume in which the quantity assigned to each voxel in the processed data volume is the result obtained by carrying out the smoothing operation in that voxel in the seismic data volume.

Suitably this comprises applying an edge-preserving filter on the seismic data in each voxel, the orientation of the filter being directed along the local orientation in that voxel, and assigning the result obtained by applying the edge-preserving filter to the voxel to obtain the processed seismic data. The results assigned to the voxels in the seismic is the processed data volume.

In the method of the present invention, the edge-preserving filter is not applied directly, but it is oriented. In this way the present invention provides an improved method for reducing the noise and for preserving faults.

Figure 3:
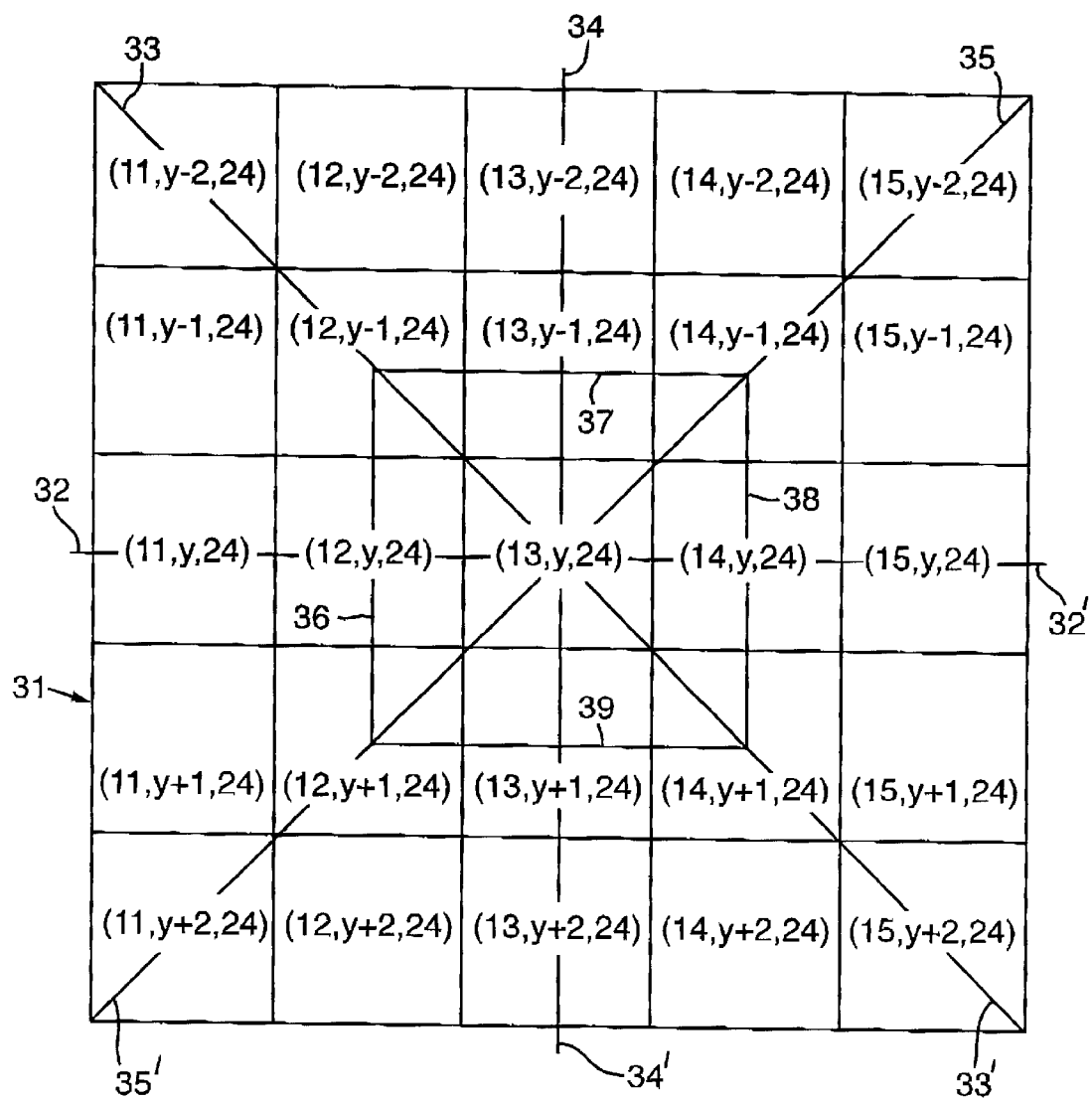
FIG. 3 shows a top view of a platelet used in applying an edge-preserving filter.

A suitable way of applying the edge-preserving filter is discussed with reference to FIGS. 2 and 3. At first a first central voxel in the seismic data volume, assume that this is voxel (13,24). Then a plane parallel to the local orientation of the relevant event at the central voxel (13,24) is defined. For the sake of argument, it is assumed that the plane is perpendicular to the plane of drawing of FIG. 2, and that the intersection of the plane and the plane of drawing of FIG. 2 is shown by the line 30.

Next a two-dimensional platelet 31 (see FIG. 3) having data at nxm positions is extracted from the seismic data volume along its structure, wherein n and m are odd integers greater or equal to three. The central voxel (13,24) is at a central position in the two-dimensional platelet 31. Because now the y-direction is involved, the central voxel is referred to in FIG. 3 by (13,y,24), and the other voxels of FIG. 2 through which the intersection 30 passes are referred to by (11,y,24), (12,y,24), (14,y,24) and (15,y,24). The two-dimensional platelet 31 of FIG. 3 has five by five data elements in the form of the voxels from (11,y−2,24) through (15,y+2,24).

The two-dimensional platelet is divided into $M_s$ sub-images. The platelet 31 of FIG. 2 is divided into nine sub-images, by means of dashed lines 32–39. The first sub-image, defined by dashed lines 32 and 33 comprises the voxels (11,y−1,24), (11,y−2,24) and (12,y−1,24); the second sub-image, defined by dashed lines 33 and 34 comprises the voxels (12,y−2,24), (13,y−1,24) and (13,y−2,24); the third sub-image, defined by dashed lines 34 and 35 comprises the voxels (14,y−2,24), (14,y−1,24) and (15,y−2,24); the fourth sub-image, defined by dashed lines 35 and 32' comprises the voxels (15,y−1,24), (14,y,24) and (15,y,24); the fifth sub-image, defined by dashed lines 32' and 33' comprises the voxels (14,y+1,24), (15,y+1,24) and (15,y+2,24); the sixth sub-image, defined by dashed lines 33' and 34' comprises the voxels (13,y+1,24), (13,y+2,24) and (14,y+2,24); the seventh sub-image, defined by dashed lines 34' and 35' comprises the voxels (12,y+1,24), (12,y+2,24) and (11,y+2,24); the eighth sub-image, defined by dashed lines 35' and 32 comprises the voxels (11,y+1,24), (11,y,24) and (12,y,24); and the ninth sub-image, defined by dashed lines 36, 37, 38 and 39 comprises the voxels (12,y−1,24), (13,y−1,24), (14,y−1,24), (12,y,24), (13,y,24), (14,y,24), (12,y+1,24), (13,y+1,24) and (14,y+1,24).

For each sub-image a number $m_i$ representing the average (mean or median) and the variance $\sigma_i$ is calculated. The pairs of average and variance for the sub-images are sorted by ascending order of the variance. Then to the central voxel (13,y,24) a value is assigned equal to $$\left(\sum_{i=1}^{k} m_i/\sigma_i\right) / \left(\sum_{i=1}^{k} 1/\sigma_i\right),$$

wherein the upper summation limit k is a number between 1 and $M_s$, the number of sub-images.

Then this process is repeated for all other voxels in the seismic data volume to obtain a processed seismic data volume in which the quantity assigned to each voxel in the processed data volume is the result obtained by applying the edge-preserving filter to the corresponding voxel in the seismic data volume.

Suitably, the upper summation limit k is related to an edge preservation parameter, $\epsilon$, in the closed interval [0,1] by the following equation $k=1+(M_s-1)(1-\epsilon)$, wherein k is then rounded-off to get an integer value.

Now is discussed an alternative method of processing the seismic data covering the predetermined volume of earth, which seismic data consists of a quantity assigned to a voxel in a seismic data volume that represents a pre-determined volume of the earth.

In the method described with reference to FIGS. 1–3, data was extracted in a plane parallel to the local orientation of the seismic data and then by applying an edge-preserving filter, for each voxel was determined whether there was an edge in the neighborhood. In the alternative method, however, only that part of the platelet is used that is defined by shifts which correspond to a relatively large similarity of the seismic data.

The alternative method comprises determining for each voxel (x,y,z) in the seismic data volume the shifts $a'_{xz}$ and $a'_{yz}$ in the open interval (−A,A) pertaining to a maximum value of $S'_{xz}(x,y,z;a)$ and $S'_{yz}(x,y,z;a)$ respectively; extracting from the seismic data volume a two-dimensional platelet defined by the pair of shifts $(a'_{xz}, a'_{yz})$; and calculating the average (mean or median) of the seismic data in the platelet, to obtain a quantity that is assigned to the voxel (x,y,z) to obtain the processed seismic data.

Here
$S'_{xz}(a)=\max\{S_{xz}(x,y,z;a), \epsilon S^-_{xz}(x,y,z;a), \epsilon S^+_{xz}(x,y,z;a)\}$ and
$S'_{yz}(a)=\max\{S_{yz}(x,y,z;a), \epsilon S^-_{yz}(x,y,z;a), \epsilon S^+_{yz}(x,y,z;a)\}$,
wherein $S_{xz}(x,y,z;a)$ and $S_{yz}(x,y,z;a)$ are the similarities of the data in a skewing semblance window around the voxel having length N and a width extending from −(M−1)/2 to +(M−1)/2, $S^-_{xz}(x,y,z;a)$ and $S^-_{yz}(x,y,z;a)$ are the similarities of the data in a skewing semblance window around the voxel having length N and a width extending from −(M−1)/2 to 0, and $S^+_{xz}(x,y,z;a)$ and $S^+_{yz}(x,y,z;a)$ the similarities of the data in a skewing semblance window around the voxel having length N and a width extending from 0 to +(M−1)/2, and wherein $\epsilon$ is an edge preservation parameter in the closed interval [0,1].

The similarities $S^-_{xz}(x,y,z;a)$, $S^-_{yz}(x,y,z;a)$, $S^+_{xz}(x,y,z;a)$ and $S^+_{yz}(x,y,z;a)$ are called similarities along a half probe, to distinguish them from the similarities $S_{xz}(x,y,z;a)$ and $S_{yz}(x,y,z;a)$, which are called similarities along a full probe.

The pair of shifts $(a'_{xz}, a'_{yz})$ determines the local orientation of the seismic data in a voxel. In addition the pair determines size of the platelet on which the smoothing operation is applied. If the maximum values for the similarities are $S_{xz}$ and $S_{yz}$ (the similarities along the full probe), then there is no edge in the neighborhood and the platelet is full (four quadrants). However, whenever close to an edge, the similarity along the half probe away from the edge is larger than both the similarity along the half probe across the edge and the similarity along the full probe. Thus, if the maximum values for the similarities are $S_{xz}$ and $\epsilon S^-_{yz}$ (or $\epsilon S^+_{yz}$) or $\epsilon S^-_{xz}$ (or $\epsilon S^+_{xz}$) and $S_{yz}$ then there is an edge in the neighborhood and only a half platelet is used (two quadrants). If the maximum values for the similarities are $\epsilon S^-_{xz}$ and $\epsilon S^-_{yz}$ or $\epsilon S^+_{xz}$ and $\epsilon S^{+hd\ yz}$ then there is also an edge in the neighborhood, and only a quarter platelet is used (one quadrant).

Suitably this alternative method is carried out as set out below. At first, are determined for each voxel (x,y,z) in two mutually perpendicular vertical planes (x–z and y–z) passing through the voxel (x,y,z) and for each shift a in the open interval (–A,A) the similarities $S_{xz}$(x,y,z;a) and $S_{yz}$(x,y,z;a) of the data in a skewing semblance window around the voxel having length N and a width extending from –(M–1)/2 to +(M–1)/2, the similarities $S^-_{xz}$(x,y,z;a) and $S^-_{yz}$(x,y,z;a) of the data in a skewing semblance window around the voxel having length N and a width extending from –(M–1)/2 to 0, and the similarities $S^+_{xz}$(x,y,z;a) and $S^+_{yz}$(x,y,z;a) of the data in a skewing semblance window around the voxel having length N and a width extending from 0 to +(M–1)/2. This results in two sets of six similarities, the first set consists of the similarities $S_{xz}$(x,y,z;a), $S^-_{xz}$(x,y,z;a) and $S^+_{xz}$(x,y,z;a), and the second set consists of the similarities $S_{yz}$(x,y,z;a), $S^-_{yz}$(x,y,z;a) and $S^+_{yz}$(x,y,z;a). Then a maximum value for the similarity in the x–z plane is determined as follows $S'_{xz}(a)=\max\{S_{xz}(x,y,z;a),\epsilon S^-_{xz}(x,y,z;a),\epsilon S^+_{xz}(x,y,z;a)\}$ and a maximum value for the similarity in the y–z plane with $S'_{yz}(a)=\max\{S_{yz}(x,y,z;a), \epsilon S^-_{yz}(x,y,z;a), \epsilon S^+_{yz}(x,y,z;a)\}$. In determining the maxima, an edge preservation parameter $\epsilon$ is used, wherein $0\leq\epsilon\leq 1$.

As with the method described with reference to FIGS. 1–3, the local orientation of the seismic data is defined by the pair of shifts $(a'_{xz},a'_{yz})$. This pair is in this case the shift a'xz for which $S'_{xz}(a'_{xz})=\max(S'_{xz}(a))$, –A<a<+A and the shift $a'_{yz}$ for which $S'_{xz}(a'_{yz})=\max(S'_{yz}(a))$, –A<a<+A.

Next a two-dimensional nxm platelet defined by the pair of shifts $(a'_{xz},a'_{yz})$ is extracted from the seismic data volume. The pair of shifts $(a'_{xz},a'_{yz})$ determines the local orientation of the seismic data in a voxel, and the pair determines size of the platelet on which the smoothing operation is applied. If the maximum values for the similarities are $S_{xz}$ and $S_{yz}$ (the similarities along the full probe), then there is no edge in the neighborhood and the platelet is full (four quadrants). However, whenever close to an edge, the similarity along the half probe away from the edge is larger than both the similarity along the half probe across the edge and the similarity along the full probe. Thus, if the maximum values for the similarities are $S_{xz}$ and $\epsilon S^-_{yz}$ (or $\epsilon S^+_{yz}$) or $\epsilon S^-_{xz}$ (or $\epsilon S^+_{xz}$) and $S_{yz}$ then there is an edge in the neighborhood and only a half platelet is used (two quadrants). If the maximum values for the similarities are $\epsilon S^-_{xz}$ and $\epsilon S^-_{yz}$ or $\epsilon S^+_{xz}$ and $\epsilon S^+_{yz}$ then there is also an edge in the neighborhood, and only a quarter platelet is used (one quadrant).

Finally the average (mean or median) of the seismic data in the platelet is calculated, to obtain a quantity that is assigned to the voxel (x,y,z) to obtain the processed seismic data volume.

When the similarity is calculated by means of semblance the equations become for the x–z plane:

$$S_{xz}(x, y, z; a) = \frac{\sum_{j=-n}^{+n}\left\{\sum_{i=-m}^{+m} f[x+i, y, z+j+ai/m]\right\}^2}{M \sum_{i=-n}^{+n} \sum_{j=-m}^{+m} (f[x+i, y, z+j+ai/m])^2}$$

$$S^-_{xz}(x, y, z; a) = \frac{\sum_{j=-n}^{+n}\left\{\sum_{i=-m}^{0} f[x+i, y, z+j+ai/m]\right\}^2}{(m+1)\sum_{i=-n}^{+n} \sum_{j=-m}^{0} (f[x+i, y, z+j+ai/m])^2}$$

$$S^+_{xz}(x, y, z; a) = \frac{\sum_{j=-n}^{+n}\left\{\sum_{i=0}^{+m} f[x+i, y, z+j+ai/m]\right\}^2}{(m+1)\sum_{i=-n}^{+n} \sum_{j=0}^{+m} (f[x+i, y, z+j+ai/m])^2}$$

The equations for the y–z plane are:

$$S_{yz}(x, y, z; a) = \frac{\sum_{j=-n}^{+n}\left\{\sum_{i=-m}^{+m} f[x, y+i, z+j+ai/m]\right\}^2}{M \sum_{i=-n}^{+n} \sum_{j=-m}^{+m} (f[x, y+i, z+j+ai/m])^2}$$

$$S^-_{yz}(x, y, z; a) = \frac{\sum_{j=-n}^{+n}\left\{\sum_{i=-m}^{0} f[x, y+i, z+j+ai/m]\right\}^2}{(m+1)\sum_{i=-n}^{+n} \sum_{j=-m}^{0} (f[x, y+i, z+j+ai/m])^2}$$

$$S^+_{xz}(x, y, z; a) = \frac{\sum_{j=-n}^{+n}\left\{\sum_{i=0}^{+m} f[x, y+i, z+j+ai/m]\right\}^2}{(m+1)\sum_{i=-n}^{+n} \sum_{j=0}^{+m} (f[x, y+i, z+j+ai/m])^2}$$

Figure 4:
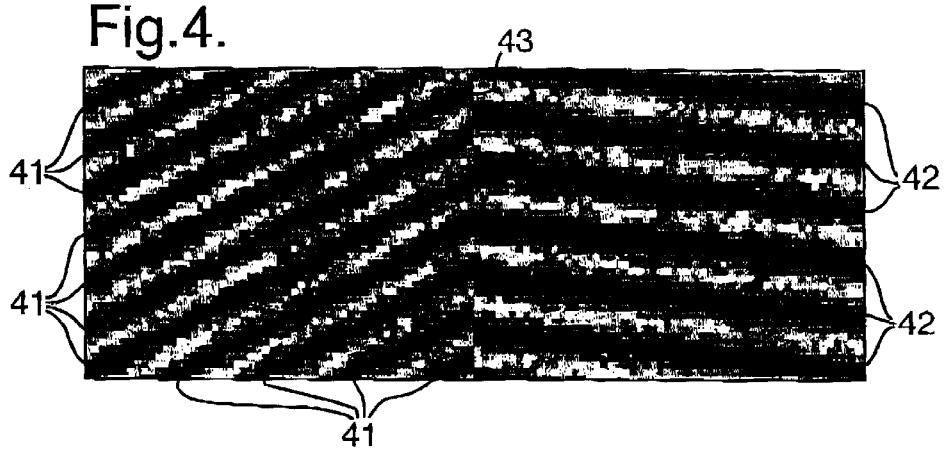
FIG. 4 shows a section through an artificial seismic data volume.
Figure 5A:
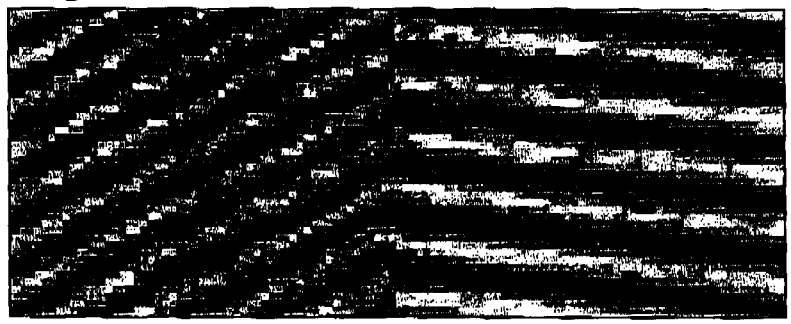
FIGS. 5a and 5b show application of an edge preserving filter and a structurally oriented filter to the artificial seismic data of FIG. 4.
Figure 5B:
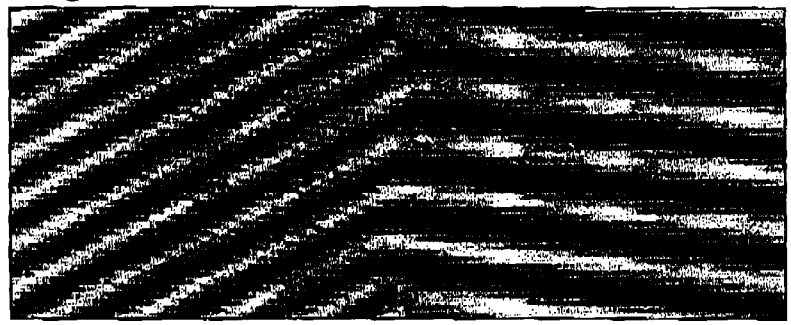
Figure 6:
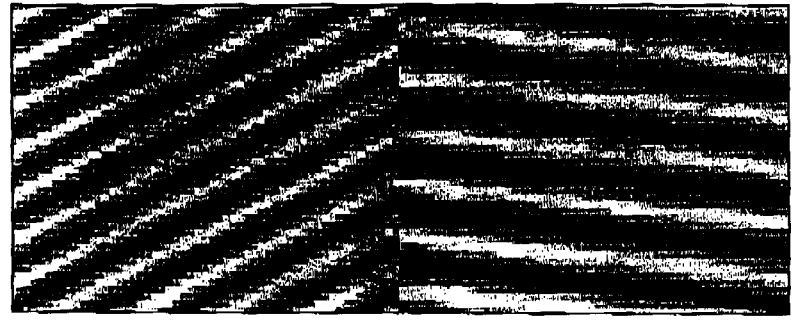
FIG. 6 shows the result of applying the method of the present invention to the data of FIG. 4.

Application of this method will be described by way of example with reference to FIGS. 4–6. FIG. 4 shows a vertical section through a seismic data volume with artificial data with noise. The sloping lines 41 and 42 show the layering and the line 43 is an edge.

An edge preserving filter (see FIG. 5a) does not suppress the noise, and moreover, the edge is disappearing. Structurally oriented filtering (see FIG. 5b) suppresses the noise and blurs the edge.

In contrast thereto, the combination of structurally oriented filtering and edge preservation according to the present invention (see FIG. 6) gives a clear picture, wherein noise is suppressed and the edge is preserved and enhanced. From FIG. 6 it can be seen that surprisingly the combination gives a better picture than could be expected from edge preserving filtering and structurally oriented filtering.

The following data apply to the pictures, the size of the pictures is 111 pixels (horizontal) by 44 pixels (vertical), wherein the pixels have values between 0 and 255.

For all pictures, the length of the semblance window N and the number of traces or channels, M, are equal to 11. The filter type is median. In order to obtain FIGS. 5a and 6, the edge preservation parameter, $\epsilon$, is 0.9.

In the above we have not specified the values x,y,z. However, because use is made of voxels the x, y and z co-ordinates are integers. In case the term i.a/m in the semblance equations is not an integer, one can use the nearest voxel or interpolate between the nearest voxels to get the value for a non-integer voxel.

Moreover, the shift a itself need not be an integer. In this case the value for a non-integer voxel can be obtained by interpolation, for example by means of a parabola.

In the above it is stated that the local orientation of the data is defined by the pair of shifts ($a_{xz}$, $a_{yz}$). However, for very large dips, this approach may not lead to an acceptable result. Therefore the following three parameters are calculated:

$$S_z = S_{xz}(x,y,z;a_{xz}) + S_{yz}(x,y,z;a_{yz}),$$

$$S_y = S_{xy}(x,y,z;a_{xy}) + S_{zy}(x,y,z;a_{zy})$$

and $$S_x = S_{yx}(x,y,z;a_{yx}) + S_{zx}(x,y,z;a_{zx}).$$

If $S_z$ is the maximum of the three, then the structure is more or less parallel to the x–y plane and the pair of shifts ($a_{xz}$, $a_{yz}$) gives the local orientation of the seismic data. If $S_y$ is the maximum of the three, then the structure is more or less parallel to the x–z plane and the pair of shifts ($a_{xy}$, $a_{zy}$) gives the local orientation of the seismic data. If $S_x$ is the maximum of the three, then the structure is more or less parallel to the y–z plane and the pair of shifts ($a_{yx}$, $a_{zx}$) gives the local orientation of the seismic data.

The equations for $S_{xz}$ and $S_{yz}$ were given above, the other equations are:

$$S_{xy}(x,y,z;a) = \frac{\sum_{j=-n}^{+n}\left\{\sum_{i=-m}^{+m} f[x+i, y+j+ai/m, z]\right\}^2}{M \sum_{i=-n}^{+n} \sum_{j=-m}^{+m} (f[x+i, y+j+ai/m, z])^2},$$

$$S_{zy}(x,y,z;a) = \frac{\sum_{j=-n}^{+n}\left\{\sum_{i=-m}^{+m} f[x, y+j+ai/m, z+i]\right\}^2}{M \sum_{i=-n}^{+n} \sum_{j=-m}^{+m} (f[x, y+j+ai/m, z+i])^2},$$

$$S_{yx}(x,y,z;a) = \frac{\sum_{j=-n}^{+n}\left\{\sum_{i=-m}^{+m} f[x+j+ai/m, y+i, z]\right\}^2}{M \sum_{i=-n}^{+n} \sum_{j=-m}^{+m} (f[x+j+ai/m, y+i, z])^2} \text{ and}$$

$$S_{zx}(x,y,z;a) = \frac{\sum_{j=-n}^{+n}\left\{\sum_{i=-m}^{+m} f[x+j+ai/m, y, z+i]\right\}^2}{M \sum_{i=-n}^{+n} \sum_{j=-m}^{+m} (f[x+j+ai/m, y, z+i])^2}.$$

The present invention has been described for a three-dimensional application. However, it can as well be applied in a two-dimensional section, where y=0, and in a four-dimensional volume.

What is claimed is:

1. A method of processing seismic data to obtain a processed seismic data volume comprising:
   a) obtaining seismic data covering a predetermined volume of earth, which seismic data comprises a quantity assigned to a voxel in a seismic data volume that represents the pre-determined volume of earth;
   b) determining for each voxel in the seismic data volume a local orientation of the seismic data, which local orientation is the orientation of a plane tangent to the seismic data in that voxel;
   c) determining for each voxel whether there is an edge in its neighborhood; and
   d) carrying out a smoothing operation on each voxel in the seismic data volume, in a direction such that the direction of the smoothing operation is the local orientation of the data and wherein the smoothing operation does not go over the edge, to obtain a processed seismic data volume in which the quantity assigned to each voxel in the processed data volume is a result obtained by carrying out the smoothing operation in that voxel in the seismic data volume.

2. The method of processing seismic data according to claim 1, wherein steps c) and d) comprise applying an edge-preserving filter on the seismic data in each voxel, the orientation of the filter being directed along the local orientation in that voxel, and assigning the result obtained by applying the edge-preserving filter to the voxel to obtain the processed seismic data volume.

3. The method of processing seismic data according to claim 2, wherein applying the edge-preserving filter on the seismic data in a voxel comprises the steps of:
   1) defining an orientation plane which includes the voxel, parallel to the local orientation of the seismic data in the voxel;
   2) extracting from the seismic data volume a data platelet having a center, which comprises seismic data at nxm positions (n and m being odd numbers greater or equal to three) which lie in the orientation plane, wherein the center of the data platelet coincides with the voxel;
   3) dividing the data platelet into $M_s$ sub-images, each subimage including the voxel, and determining for each sub-image a number $m_i$ representing the average and the variance $\sigma_i$ of the seismic data forming the sub-image; and
   4) assigning to the voxel a value equal to $$\left(\sum_{i=1}^{k} m_i/\sigma_i\right) / \left(\sum_{i=1}^{k} 1/\sigma_i\right),$$

wherein the set $\{m_i,\sigma_i\}$ is sorted by ascending $\sigma_i$, and wherein the upper summation limit k is a number between 1 and $M_s$.

4. The method of processing seismic data according to claim 3, wherein the upper summation limit k is related to an edge preservation parameter, $\epsilon$, in a closed interval [0,1] by the following equation $k=1+(M_s-1)(1-\epsilon)$.

5. The method of processing seismic data of claim 1, wherein the step of determining for each voxel the local orientation of the seismic data comprises determining in two mutually perpendicular vertical planes (x–z and y–z) passing through the voxel, shifts $a_{xz}$ (in the x–z plane) and $a_{yz}$ (in the y–z plane) for which the similarity of the data in a skewing semblance window around the voxel having length N and a width M is maximized, wherein the pair of shifts ($a_{xz}$, $a_{yz}$) defines the local orientation of the data in that voxel.

6. The method of processing seismic data according to claim 1, wherein steps b), c) and d) comprise for each voxel (x,y,z) in the seismic data volume determining the shifts $a'_{xz}$ and $a'_{yz}$ in the open interval (−A,A) pertaining to a maximum value of $S'_{xz}(x,y,z;a)$ and $S'_{yz}(x,y,z;a)$ respectively; extracting from the seismic data volume a two-dimensional platelet defined by the pair of shifts $(a'_{xz}, a'_{yz})$; and calculating the average of the seismic data in the platelet, to obtain a quantity that is assigned to the voxel (x,y,z) to obtain the processed seismic data volume, wherein $$S'_{xz}(a)=\max\{S_{xz}(x,y,z;a), \epsilon S^-_{xz}(x,y,z;a), \epsilon S^+_{xz}(x,y,z;a)\}$$

and $$S'_{yz}(a)=\max\{S_{yz}(x,y,z;a), \epsilon S^-_{yz}(x,y,z;a), \epsilon S^+_{yz}(x,y,z;a)\},$$

wherein $S_{xz}(x,y,z;a)$ and $S_{yz}(x,y,z;a)$ are the similarities of the data in a skewing semblance window around the voxel having length N and a width extending from $-(M-1)/2$ to $+(M-1)/2$, $S^-_{xz}(x,y,z;a)$ and $S^-_{yz}(x,y,z;a)$ are the similarities of the data in a skewing semblance window around the voxel having length N and a width extending from $-(M-1)/2$ to 0, and $S^+_{xz}(x,y,z;a)$ and $S^+_{yz}(x,y,z;a)$ the similarities of the data in a skewing semblance window around the voxel having length N and a width extending from 0 to $+(M-1)/2$, and wherein $\epsilon$ is an edge preservation parameter in the closed interval [0,1].

7. The method of processing seismic data according to claim 1, wherein steps b), c) and d) comprise for each voxel (x,y,z) in the seismic data volume the steps of 1) determining for each voxel (x,y,z) in two mutually perpendicular vertical planes (x–z and y–z) passing through the voxel (x,y,z) and for each shift a in the open interval (–A,A) the similarities $S_{xz}(x,y,z;a)$ and $S_{yz}(x,y,z;a)$ of the data in a skewing semblance window around the voxel having length N and a width extending from $-(M-1)/2$ to $+(M-1)/2$, the similarities $S^-_{xz}(x,y,z;a)$ and $S^-_{yz}(x,y,z;a)$ of the data in a skewing semblance window around the voxel having length N and a width extending from $-(M-1)/2$ to 0, the similarities $S^+_{xz}(x,y,z;a)$ and $S^+_{yz}(x,y,z;a)$ of the data in a skewing semblance window around the voxel having length N and a width extending from 0 to $+(M-1)/2$, and $$S'_{xz}(a)=\max\{S_{xz}(x,y,z;a), \epsilon S^-_{xz}(x,y,z;a), \epsilon S^+_{xz}(x,y,z;a)\}$$

and $$S'_{yz}(a)=\max\{S_{yz}(x,y,z;a), \epsilon S^-_{yz}(x,y,z;a), \epsilon S^+_{yz}(x,y,z;a)\},$$

wherein $\epsilon$ is an edge preservation parameter in the closed interval [0,1];

2) determining the shift $a'_{xz}$ for which $S'_{xz}(a'_{xz})=\max(S'_{xz}(a))$, $-A<a<+A$ and the shift $a'_{yz}$ for which $S'_{yz}(a'_{yz})=\max(S'_{yz}(a))$, $-A<a<+A$;

3) extracting from the seismic data volume a two-dimensional platelet defined by the pair of shifts $(a'_{xz}, a'_{yz})$; and 4) calculating the average of the seismic data in the platelet, to obtain a quantity that is assigned to the voxel (x,y,z) to obtain the processed seismic data volume.

* * * * *